United States Patent [19]
Luschen et al.

[11] 3,743,321
[45] July 3, 1973

[54] REMOVABLE ARTICLE HOLDING DEVICE

[76] Inventors: Fred H. Luschen, 711 Greenview Road, Itasca; Raymond C. Piccony, 246 Pamela Drive, Bensenville, both of Ill.

[22] Filed: Jan. 3, 1972

[21] Appl. No.: 214,811

[52] U.S. Cl. .............................................. 280/202
[51] Int. Cl. ................................................ B62j 9/00
[58] Field of Search ...................................... 280/202

[56] References Cited
FOREIGN PATENTS OR APPLICATIONS
113,086   7/1943   Sweden .............................. 280/202
678,044   8/1952   Great Britain ..................... 280/202

*Primary Examiner*—Philip Goodman
*Attorney*—Richard W. Carpenter

[57] ABSTRACT

An arrangement for facilitating the removable attachment of an infant seat to a bicycle which includes a bracket permanently attached to the goose-neck of the bicycle and adapted to removably receive portions of said infant seat.

9 Claims, 6 Drawing Figures

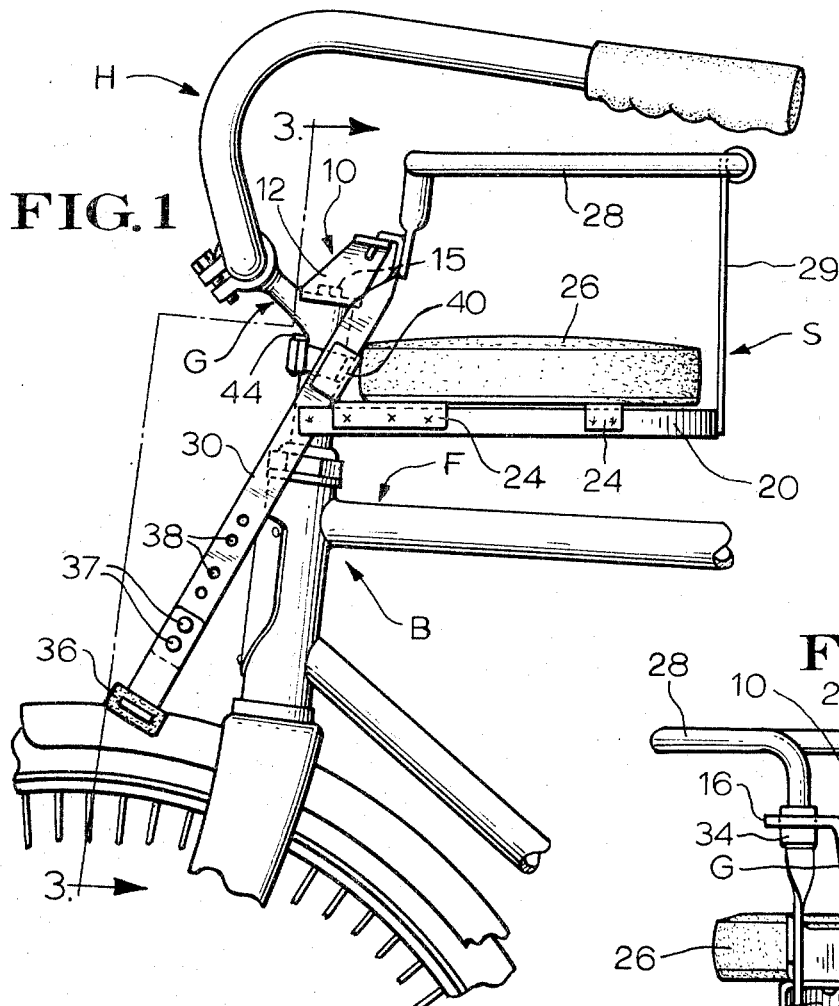
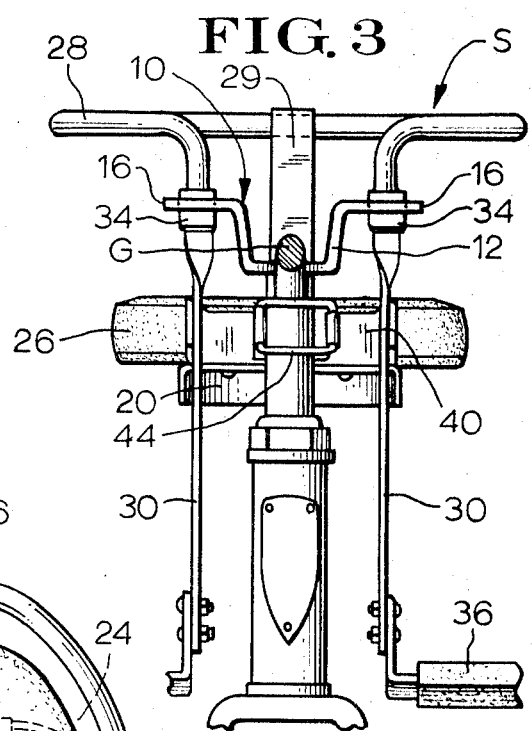
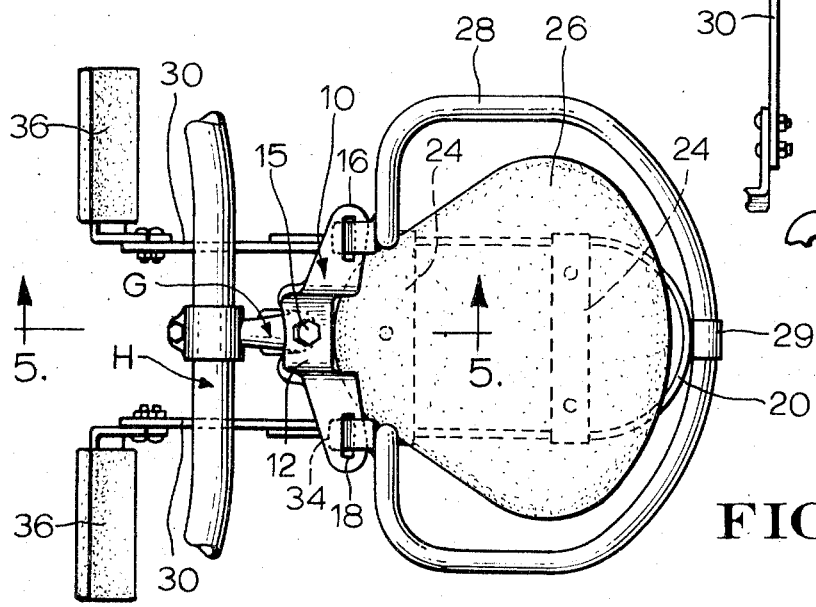

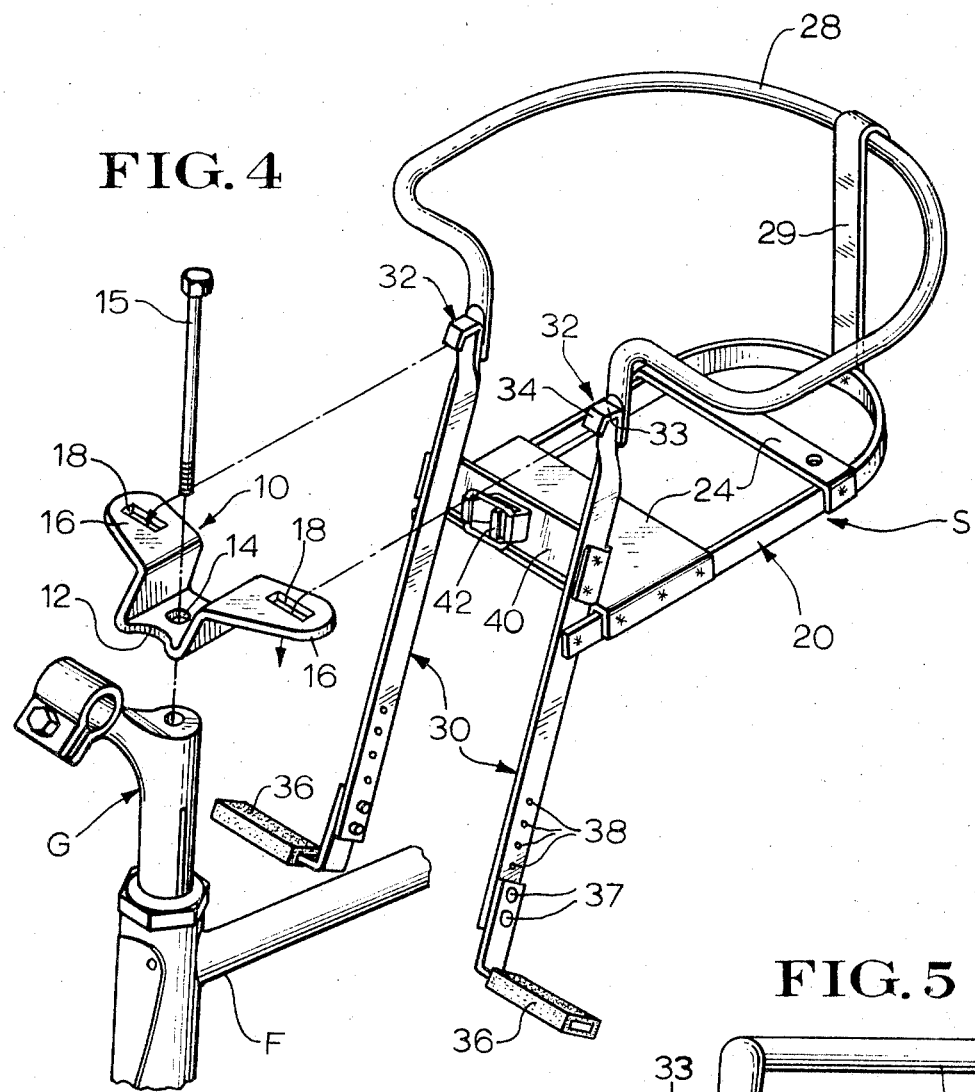
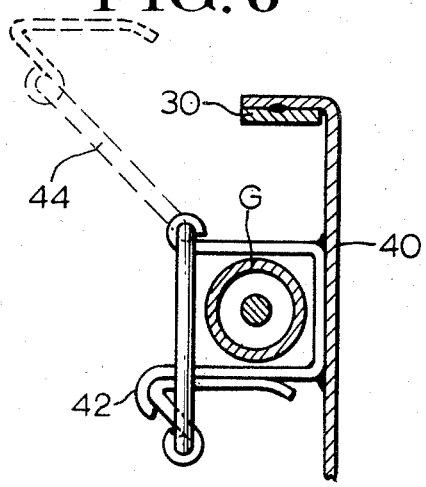
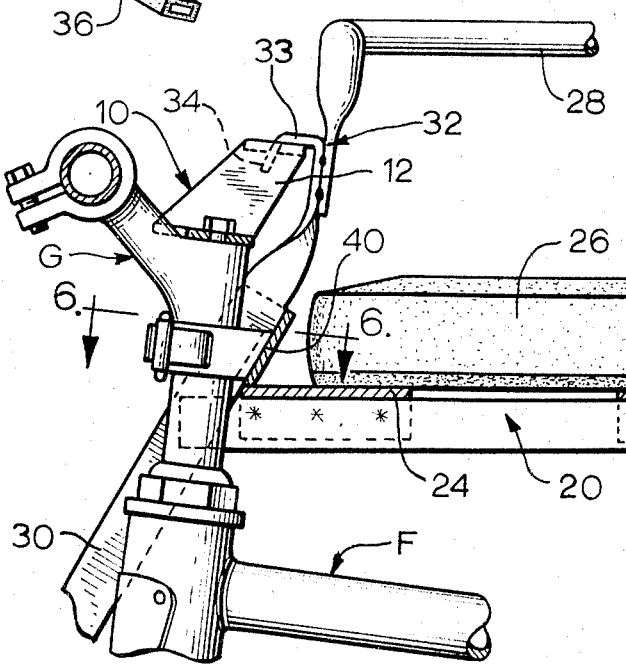

REMOVABLE ARTICLE HOLDING DEVICE

It is a primary object of this invention to provide an improved means and mechanism, which is relatively simple and inexpensive to produce and easy to attach permanently to a bicycle, to accomodate the quick attachment or removal of an auxillary infant seat.

A more specific object of the invention is the provision, in an arrangement of the type described, of a bracket which may be easily attached permanently to the goose-neck of most any type of bicycle, and which is adapted to engage and interlock with portions of a removable infant seat.

These and other object of the invention will be more readily apparent from an examination of the following description and drawings, wherein:

FIG. 1 is a fragmentary side elevation of a bicycle having a removable infant seat attached thereto by an arrangement embodying features of the invention;

FIG. 2 is a top plan view of the structure illustrated in FIG. 1;

FIG. 3 is a transverse, vertical section taken on line 3 — 3 of FIG. 1;

FIG. 4 is an exploded perspective view of part of the structure illustrated in FIG. 1;

FIG. 5 is a longitudinal, vertical section taken on line 5 — 5 of FIG. 2; and

FIG. 6 is a horizontal section taken on 6 — 6 of FIG. 5.

It will be understood that, for purposes of clarity, certain elements have been intentionally omitted from certain views where they are believed to be illustrated to better advantage in other views.

Referring now to the drawings for a better understanding of the invention, and particularly to FIGS. 1 and 4, it will be seen that a removable infant seat, indicated generally at S, is shown attached to a bicycle B which includes a frame F and handlebars H interconnected in the conventional manner by a goose-neck member G.

Easy removable attachment of the seat to the bicycle is accomplished by the novel mounting bracket member 10 which is permanently secured to the goose-neck G of the bicycle by the bolt 15 which is a standard part of any conventional bicycle.

Mounting bracket member 10, as best seen in FIG. 4, includes a generally U-shaped central portion 12 having an opening 14, for receiving bolt 15, and a pair of laterally spaced, horizontally extending shelf portions 16 presenting slots 18 extending therethrough for receiving portions of seat S in a manner hereinafter described.

As best seen in FIGS. 4 and 5, seat S includes a frame, indicated at 20, which includes a somewhat horseshoe shaped lower support rim having side portions interconnected by one or more cross-stuts 24 which support a cushion 26. Frame 20 also includes an upper guard or rim 28 connected at the rear of the seat by a vertical stut 29.

At the forward end of the seat upper and lower rims 28 and 22 are interconnected by a pair of elongated, vertically extending support and mounting braces 30 which extend a substantial distance below lower rim 22. At their upper ends braces 30 each present a forwardly facing retaining hook member 32 which has a horizontal portion 33, adapted to be seated on and supported by a related horizontal shelf portion 16 of mounting bracket 10, and a depending vertical portion 34, adapted to extend downwardly through slot 18 of a related shelf portion 16 of mounting bracket 10.

At their lower extremities vertical braces 30 present foot rest members 36 which may be adjustably secured thereto by bolts 37 extending through vertically spaced holes 38.

Vertical braces 30 are interconnected, intermechate their ends, by an integral, horizontally extending crossbar 40 which has permanently attached to its forward side a quick-release type clamp 42 and buckle 44 adapted to engage and detachably connect the seat to the goose-neck or frame of the bicycle.

Thus, it will be seen that the novel seat and mounting arrangement provides both means and apparatus for quickly attaching to or removing an infant seat from a conventional bicycle which has been modified only by the permanent attachment of the special mounting bracket 10 which can remain in place at all times without interfering in any way with the normal operation of the bicycle.

After mounting bracket 10 has been permanently secured to the goose-neck, as previously described, the seat may be easily placed into position with the hook members of the seat engaging the shelf portions of the mounting bracket and with vertical braces 30 disposed on opposite sides of the goose-neck and related portion of the bicycle frame with the cross bar 24 of the seat against the rear of the gooseneck. Buckle 44 of clamp 42 is then snapped in place to lock the seat in position and thereby prevent its accidental detachment therefrom. To remove the seat when its use is not desired buckle 44 is unsnapped and the seat is lifted from the bicycle.

While the above description and drawings describe and illustrate the novel mounting bracket as used for facilitating the removable attachment of an infant seat, it will be appreciated that it may serve equally well for attachment of a basket or other type of holding member (not specifically illustrated) provided with a similar pair of vertical mounting braces having hook elements for engaging the shelf portions of mounting bracket 10 and a cross stut presenting a clamp and buckle for quick attachment to and release from the goose-neck of a bicycle.

We claim:

1. In a removable infant seat arrangement for a bicycle, the combination of:
   a. a bicycle having a frame including a vertical portion, a pair of handlebars, and a goose-neck having one portion received within and secured to the vertical portion of said frame and having another portion receiving and secured to said handlebars;
   b. a mounting bracket having a generally U-shaped center portion attached to said goose-neck, and including a pair of transversely spaced shelf portions extending laterally outward from upper portions of said center portion and presenting aperatures for receiving portions of a removable infant seat;
   c. a removable infant seat including:
      i. a chair member;
      ii. a pair of laterally spaced, vertically extending mounting elements attached to said chair member and having, at their upper ends, downwardly extending hook portions adapted to be removably received within respective aperatures of said mounting bracket shelf portions;

iii. a horizontally disposed cross element extending between said mounting elements and including quick-release clamping means for removable attachment to the goose-neck of said bicycle.

2. In a removable article holding device arrangement for a bicycle, the combination of:
a. a bicycle having a frame including a vertical portion, a pair of handlebars, and a goose-neck having one portion received within and secured to the vertical portion of said frame and having another portion receiving and secured to said handlebars;
b. a mounting bracket having a generally U-shaped center portion attached to said goose-neck, and including a pair of transversely spaced shelf portions extending laterally outward from upper portions of said center portion and presenting aperatures for receiving portions of a removable article holding device;
c. a removable article holding device including:
  i. an article holding member;
  ii. a pair of laterally spaced, vertically extending mounting elements attached to said article holding member and having, at their upper ends, downwardly extending hook portions adapted to be removably received within respective aperatures of said mounting bracket shelf portions;
  iii. a horizontally disposed cross element extending between said mounting elements and including quick-release clamping means for removable attachment to the goose-neck of said bicycle.

3. An arrangement according to claim 2, wherein said article holding member is an infant seat.

4. An arrangement according to claim 2, wherein said article holding member is a basket.

5. An arrangement according to claim 2, wherein said mounting bracket is permanently secured to said goose-neck by the same bolt that is normally used to secure the goose-neck to the related vertical portion of the bicycle frame.

6. An arrangement according to claim 2, wherein said clamping means includes a generally U-shaped clamping element adapted to receive said goose-neck, and a quick-release buckle element movably connected to one forward end of the clamp element and adapted to be removably connected to another forward end of said clamp element in front of said goose-neck.

7. An arrangement according to claim 3, wherein said infant seat includes a lower cushion supporting frame and an upper retaining and supporting frame.

8. An arrangement according to claim 3, wherein said vertically extending mounting elements present, adjacent the lower ends thereof, outwardly projecting foot rests.

9. An arrangement according to claim 8, wherein the vertical position of said foot rests is readily adjustable.

* * * * *